United States Patent [19]

Allen et al.

[11] Patent Number: 5,190,986
[45] Date of Patent: Mar. 2, 1993

[54] ELASTOMERIC LOW DENSITY FOAMABLE COMPOSITIONS AND PROCESS OF MAKING THE SAME AND ARTICLES MADE THEREFROM

[75] Inventors: Richard B. Allen, Troy, N.Y.; Popkin Shenian, Pittsfield, Mass.

[73] Assignee: General Electric Company, Pittsfield, Mass.

[21] Appl. No.: 802,941

[22] Filed: Dec. 6, 1991

Related U.S. Application Data

[62] Division of Ser. No. 550,549, Jul. 9, 1990, Pat. No. 5,130,340.

[51] Int. Cl.$^5$ .............................................. C08J 9/16
[52] U.S. Cl. ...................................... 521/139; 521/59; 521/140; 264/53; 264/DIG. 10
[58] Field of Search .................... 521/139, 59, 140; 264/53, DIG. 10

[56] References Cited

U.S. PATENT DOCUMENTS

| | | | |
|---|---|---|---|
| 3,003,193 | 10/1961 | Chisholm et al. | 521/79 |
| 3,026,272 | 3/1962 | Rubens et al. | 521/143 |
| 3,026,273 | 2/1962 | Engles | 521/79 |
| 3,026,274 | 3/1962 | McMillan et al. | 521/60 |
| 3,121,132 | 2/1964 | Del Bene | 521/60 |
| 3,250,834 | 5/1966 | Collins | 264/53 |
| 3,306,874 | 2/1967 | Hay | 528/215 |
| 3,306,875 | 2/1967 | Hay | 528/215 |
| 3,492,249 | 1/1970 | Pezarro et al. | 521/139 |
| 3,743,611 | 7/1973 | Muroi et al. | 521/59 |
| 3,909,463 | 9/1975 | Hartman | 521/139 |
| 3,959,545 | 5/1976 | Siedenstrang | 521/139 |
| 4,234,706 | 11/1980 | White | 525/390 |
| 4,303,756 | 12/1981 | Kajimura et al. | 521/60 |
| 4,385,016 | 5/1983 | Gwinn | 264/37 |
| 4,442,232 | 4/1984 | Kajimura et al. | 521/60 |
| 4,477,649 | 10/1984 | Mobley | 528/212 |
| 4,482,697 | 11/1984 | Haitko | 528/215 |
| 4,500,271 | 2/1985 | Smith | 425/67 |
| 4,532,263 | 7/1985 | Krutchen et al. | 521/133 |
| 4,544,677 | 10/1985 | Allen et al. | 521/138 |
| 4,587,272 | 5/1986 | Avakian et al. | 521/138 |
| 4,598,100 | 7/1986 | Krutchen et al. | 521/81 |
| 4,598,101 | 7/1986 | Krutchen et al. | 521/81 |
| 4,598,104 | 7/1986 | Krutchen et al. | 521/79 |
| 4,606,873 | 8/1986 | Biglione et al. | 264/53 |
| 4,661,302 | 4/1987 | Park | 521/79 |
| 4,666,946 | 5/1987 | Fudge | 521/139 |
| 4,705,811 | 11/1987 | Park | 521/81 |
| 4,734,441 | 3/1988 | Park | 521/139 |
| 4,764,535 | 8/1988 | Leicht | 521/139 |

FOREIGN PATENT DOCUMENTS

| | | |
|---|---|---|
| BE-701412 | 6/1990 | Belgium . |
| 682464 | 3/1964 | Canada . |
| 1023521 | 1/1978 | Canada . |
| FR-A-2003581 | 12/1969 | France . |
| 2041334 | 2/1990 | Japan . |
| 948300 | 6/1962 | United Kingdom . |

OTHER PUBLICATIONS

DE 1604362-Derwent Publications Ltd.

*Primary Examiner*—Morton Foelak
*Attorney, Agent, or Firm*—Andrew C. Hess

[57] ABSTRACT

Elastomeric low density foamable compositions are described which are prepared from blends comprised of a major amount of a block copolymer comprised of an alkenyl aromatic and a conjugated diene and a minor amount of one or more other thermoplastic resins. Also described are such foamable compositions wherein such blends are comprised of a major amount of a triblock copolymer of the A-B-A type and a minor amount of polystyrene resin and/or polyphenylene ether resin. Also described are processes for preparing such low density foamable compositions and articles made therefrom.

24 Claims, No Drawings

ELASTOMERIC LOW DENSITY FOAMABLE COMPOSITIONS AND PROCESS OF MAKING THE SAME AND ARTICLES MADE THEREFROM

This is a division of application Ser. No. 07/550,549, filed on Jul. 9, 1990, now U.S. Pat. No. 5,130,340.

This invention relates to elastomeric low density foamable compositions prepared from blends comprised of a major amount of a block copolymer comprised of an alkenyl aromatic and a conjugated diene and a minor amount of one or more other thermoplastic resins. Preferably, the invention relates to such foamable compositions wherein such blends are comprised of a major amount of a triblock copolymer of A-B-A type and a minor amount of a polystyrene resin and/or polyphenylene ether resin. The invention also relates to a process for preparing such low density foamable compositions and to articles made therefrom.

BACKGROUND OF THE INVENTION

Generally, it is easy to obtain polystyrene beads having a high expansion ratio. The resulting foamed articles made from such beads have high rigidity and good shape retention, but have the disadvantage in that they are fragile and have poor chemical resistance, oil resistance and thermal stability. In pre-expanded bead form, polystyrene has a glass transition temperature of, for example, 80°-95° C., precluding its use in automotive foams, for example, under the hood.

Foamed products of polystyrene and styrene-maleic anhydride are known, e.g., from U.S. Pat. No. 4,442,232 and, although they have higher thermal resistance, they are rather difficult to prepare, and have limitations in their impact resistance and compressive strength.

Expandable thermoplastic beads comprising ethylene-propylene copolymers grafted with vinyl aromatic monomers are also known, e.g., from Kajimura et al., U.S. Pat. No. 4,303,756. The compositions which are produced are said to have excellent thermal stability, but resistance to solvents and oxidation tend to be lower than desirable.

To overcome these drawbacks, it has also been proposed to form foams from blends of polyphenylene ethers and polystyrene or high impact, i.e., rubber-modified grafted, polystyrene imbibed with liquid blowing agents. Mention can be made of U.S. Pat. No. 3,492,249, which suggests foaming a physical blend of polyphenylene ether and polystyrene. However, to develop a maximum strength, the cells have to be elongated and this involves a hot-stretching step, which is not desirable.

In U.S. Pat. Nos. 4,598,100 and 4,598,101, blends of a polyphenylene ether resin and high impact polystyrene are imbibed at atmospheric pressure with a volatile chlorinated hydrocarbon in an extruder, and the blend is extruded thereafter into a foam.

In U.S. Pat. Nos. 4,532,263 and 4,598,104, there is disclosed impregnating pellets of a blend of polyphenylene ether and high impact polystyrene, pre-expanding the pellets, and then shaping them in an open mold to form foam. The last-mentioned patent also discloses that foamed sheets of blended polyphenylene ether resin and polystyrene can be thermo-formed into shaped foamed articles.

Methods for the production of expandable beads for use in the manufacture of molded articles are well-known in the art. Traditional expanded polystyrene (EPS) technology has existed since the early 1950's.

The production of expandable beads can include the incorporation of a blowing agent by one of the three methods. One method, known as the "one step" process, is to suspend styrene monomer, initiators and hydrocarbon blowing agent in water and polymerize at high temperatures. This method is taught by Japanese Patent Publication No. 32623/70.

In a second process called the "1½ step" process, the polymerization is brought to 80% completion before the blowing agent is introduced into the system.

The "two-step" process incorporates the blowing agent into suspension-polymerized beads (100% converted) or melt-compounded pellets. The two-step process is used in Japanese Patent Publication No. 36097/72 which discloses heat melting a polymer, pelletizing the melt and incorporating the formed pellets with a blowing agent.

Canadian Patent No. 1,023,521 and U.S. Pat. No. 3,003,193 disclose processes for pellet production wherein the resin is passed through the die and intermittently extruded. Canadian Patent No. 1,023,521 discloses intermittently extruding the resin in a heat plastified form under continuously applied pressure through a plurality of constricted passageways into a plurality of outlets into a zone of lower pressure to provide a plurality of closely adjacent extruded globules which then expand and adhere together to form strands which are then mechanically agitated to separate the strands into individual particles. U.S. Pat. No. 3,003,193 teaches intermittent extrusion of resin through a die with a non-reactive fluid between the intermittent resin particles as an ejection fluid.

Incorporation of the blowing agent into the extruder has been disclosed in Collins, U.S. Pat. No. 3,250,834. Collins compressed the heated polystyrene prior to introduction of the blowing agent and cooled the mixture, thereafter extruding the mixture into strands which are later cut to pellets.

The problem of temperature control while cooling the extrusion passing through the die, as causing blockage of the die, is dealt with in UK 948,200 (Platz et al.) and Canadian Patent 682,464 (Schroeder et al.). Platz et al. make use of a die either made from or lined with polytetrafluoroethylene having openings of 2 to 8 mm in diameter. Schroeder et al. on the other hand deal with this problem by regulating the temperature of the composition entering the die to assure free flow and cooling the temperature almost immediately as it exits the die.

Other processes for the production of expandable resin compositions are disclosed in U.S. Pat. No. 3,026,273 (Engles), U.S. Pat. No. 3,026,272 (Rubens et al.), U.S. Pat. No. 3,121,132 (Bene) and U.S. Pat. No. 3,026,274 (McKillan et al.). These disclosures deal with the pre-expansion of the composition. Each of these processes contemplates the production of strands which are cooled "almost immediately" after leaving the die, some under increased pressure, before chopping the strand into pellets.

The process of underwater pelletizing of polymers with an adjustable blade for varying pellet size is disclosed in Smith, U.S. Pat. No. 4,500,271.

In U.S. Pat. No. 3,003,193, a process for the production of beads of thermoplastic polymers is disclosed, wherein extrusion through a twin-screw extruder is employed to force the resin through a die under continuous pressure. The die is contacted on its face by a cutting means and thereafter a fluid which carries the globules to a zone of lower pressure where the fluid boils or evaporates and the globule is removed from the liquid and cooled to a bead. Although the patent teaches the production of uniform beads, bead size is limited in its minimum size.

It has now been discovered that foamable and expandable, elastomeric low density compositions and beads derived therefrom can be produced from compositions comprising a major amount of a block copolymer comprised of an alkenyl aromatic resin and a conjugated diene and a minor amount of one or more other thermoplastic resins.

A new method of making expandable compositions and foams has also been discovered. The method involves subjecting a bead or pellet of a polymeric composition in a dry state to a blowing agent under conditions of increased temperature and pressure for a time sufficient to obtain an expandable or foamable composition comprised of the bead or pellet having an amount of blowing agent impregnated therein.

SUMMARY OF THE INVENTION

According to the invention, there are provided elastomeric low density foamable compositions comprised of:

(a) a major amount, based on the total amount of (a) and (b), of a block copolymer comprised of alkenyl aromatic resin and diene;

(b) a minor amount, based on the total amount of (a) and (b), of one or more other thermoplastic resins; and (c) an easily volatile blowing agent present in an amount sufficient to foam the resin combination to a density of less than about 20 lbs./ft.$^3$. As used herein, the term "major amount" means that component (a) is present in an amount, based upon parts by weight, greater than each of the one or more other thermoplastic resins comprising component (b). Preferably, "major amount" means that component (a) is present in an amount of greater than 50% by weight of the total amount of (a) and (b) combined. Also preferably, the diene is a conjugated diene.

The invention also provides a process for producing elastomeric low density foamable compositions, said process comprising:

(a) providing a solid, dry thermoplastic resin composition;

(b) adding an easily volatile blowing agent in an amount sufficient to foam the resin composition to a density of less than about 20 lbs./ft.$^3$; and (c) subjecting the combination of (a) and (b) to a temperature of at least about the glass transition temperature of the alkylene aromatic segment of the block copolymer and to a pressure greater than atmospheric pressure for a time sufficient to impregnate (a) with (b) and thereby foam the resin composition to a density of less than about 20 lbs./ft.$^3$. As used herein, the term "dry" means that the resin composition has either been recovered from its polymerization medium after after having been polymerized, e.g. recovered from a suspension in water, or recovered after having been polymerized and precipitated. Also as used herein, the term "dry" encompasses those embodiments of the claimed invention wherein excess or absorbed moisture is removed from the resin composition by, for example, heating at about or below the composition's glass transition temperature for a sufficient time to effect moisture removal. Finally as used herein, the term "dry" excludes resin compositions which are uniformly heated above their glass transition temperatures or melting points to a molten or flowing state.

The invention also provides a method of use of the elastomeric low density foamable compositions, said method of use being suitable for forming a shaped polymer foam structure and comprising the steps of:

(a) imbibing particles or beads of a composition comprised of (i) a major amount, based on the total amount of (i) and (ii), of a block copolymer comprised of alkenyl aromatic resin and diene, (ii) a minor amount, based on the total amount of (i) and (ii), of one or more other thermoplastic resins; and (iii) an easily volatile blowing agent present in an amount sufficient to foam the resin combination to a density of less than about 20 lbs./ft.$^3$;

(b) heating the imbibed particles or beads to a temperature sufficient to cause expansion of said particles to a density significantly less than that of the imbibed particles or beads;

(c) filling a mold with the expanded particles or beads and subjecting the particles or beads to sufficient heat to fuse the particles or beads together; and (d) cooling the fused particles or beads to form a shaped coherent foam structure.

DETAILED DESCRIPTION OF THE INVENTION

The block copolymers of component (a) may be diblock, triblock and/or radial teleblock copolymers, mixtures of the foregoing, and the like.

The diblock A-B copolymers of an alkenyl aromatic compound, A, and a conjugated diene, B, are derived from alkenyl aromatic compounds having the formula

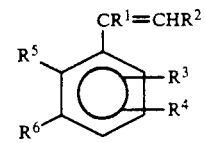

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with a hydrocarbyl group to form a napthyl group.

Specific examples of alkenyl aromatic monomers, A, include styrene, bromostyrene, chlorostyrene, a-methyl-styrene, para-methyl styrene, vinylxylene, divinylbenzene, vinyl naphthalene, and vinyl-toluene.

These are copolymerized with the diene, B, which is derived from, for example, 1,3-butadiene, 2-methyl-1,3-butadiene and 1,3-pentadiene.

The A-B block copolymers can be made by following procedures which are well-known in the art or described in the patent literature, for example, in U.K. 1,145,923. These polymers are also commercially available, e.g., from Shell Chemicals under the trade designation Shellvis 50. Preferably, these are diblock copolymers in which the aliphatic unsaturation, as in diblock B, has been reduced by hydrogenation. Such copolymers will preferably have the average unsaturation of rubber diblock B decreased to less than 20%, and more preferably less than 10% of its original value.

Hydrogenation can be effected by using a variety of hydrogenating catalysts, such as nickel or Kieselguhr, Raney nickel, copper, chromite, molybdenum sulfide, and finely divided platinum or other noble metals on a carrier.

Hydrogenation can be conducted at virtually any desired temperature or pressure, e.g., ranging from atmospheric to 3,000 psig and from 75° to 600° F., for up to 24 hours. Such procedures are well-known.

The A-B-A type block copolymers of vinyl aromatic and diene which are preferred in the present invention are well-known in the art and commercially available. These are described, for instance, in "Polymer Chemistry of Synthetic Elastomers", edited by Kennedy et al., Interscience Publishers, Vol. 23, Part II (1969), pages 553–559. Other descriptions are given in Zelinski, U.S. Pat. No. 3,251,905, and Holden et al., U.S. Pat. No. 3,321,635.

In general, the block copolymer is of the A-B-A type in which terminal blocks A, which can be the same or different, are thermoplastic homopolymers or copolymers prepared from a vinyl aromatic compound wherein the aromatic moiety can be either mono or polycyclic. Examples include styrene, alpha-methyl styrene, vinyl toluene, vinyl xylene, ethyl vinyl xylene, vinyl napthhalene and the like, or mixtures thereof.

Center Block B is an elastomeric polymer derived from a diene hydrocarbon, preferably a conjugated diene, e.g., 1,3-butadiene, 2,3-dimethyl butadiene, isoprene, 1,3-pentadiene, and the like, or mixtures thereof.

The ratio of the copolymers and the average molecular weights of each can vary broadly. Frequently, however, the molecular weight of the center block B will be greater than that of the combined terminal blocks. The molecular weight of terminal block A will preferably range from about 2,000 to 100,000, while the molecular weight of center block B is preferably from about 25,000 to about 1,000,000.

If desired, the block copolymers can be treated to hydrogenate the rubber portion of the copolymer in manners similar to hydrogenation of the A-B type copolymers.

With respect to the hydrogenated A-B-A block copolymers, it is preferred to form terminal block A having average molecular weight of from about 4,000 to about 115,000 and center block B having an average molecular weight of from about 20,000 to about 450,000. Still more preferably, the terminal block A will have an average molecular weight of from 8,000 to 60,000 while center block B will have an average molecular weight of from about 50,000 to 300,000.

Especially preferred hydrogenated block copolymers are those having a polybutadiene center block wherein from 35 to 55%, more preferably from 40 to 50%, of the butadiene carbon atoms are vinyl side chains.

The hydrogenated block copolymers are described further in Jones, U.S. Pat. No. 3,431,323 and De LaMare et al., U.S. Pat. No. 3,670,054.

In preferred compositions, the block copolymer will be an A-B-A block copolymer of the polystyrene-polybutadiene-polystyrene or polystyrene-polyisoprene-polystyrene type wherein the polybutadiene or polyisoprene portion can be either hydrogenated or non-hydrogenated.

The most preferred block copolymers of the present invention, comprise an alkenyl aromatic compound (A) and an ethylene-butylene center block (B) and are derived from compounds of the general formula:

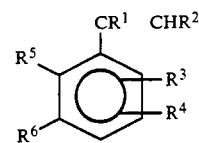

wherein $R^1$ and $R^2$ are selected from the group consisting of hydrogen and lower alkyl or lower alkenyl groups of from 1 to 6 carbon atoms; $R^3$ and $R^4$ are selected from the group consisting of chloro, bromo, hydrogen and lower alkyl of from 1 to 6 carbon atoms; $R^5$ and $R^6$ are selected from the group consisting of hydrogen, lower alkyl and lower alkenyl group of 1 to 6 carbon atoms or $R^5$ and $R^6$ may be concatenated together with hydrocarbyl groups to form a napththyl group; said compounds being free of any substituent having a tertiary carbon atom. Preferred vinyl aromatic compounds are styrene, α-methyl styrene, vinyl toluene, vinyl xylene, vinyl naphthalene, and the like.

Preferred embodiments of the block copolymer provide styrene as the vinyl aromatic compound (A) and an ethylene-butylene block as the alkene (B). Most preferred are styrene-ethylene/butylene-styrene (S-EB-S) triblock and styrene-ethylene/propylene (S-EP) diblock copolymers.

These preferred embodiments are available commercially in the various KRATON ® elastomers available from Shell Chemicals. Details on the structural composition of a number of Kratons are provided in Table 1.

TABLE 1

| | | Block Copolymers | | | | |
| --- | --- | --- | --- | --- | --- | --- |
| | | | molecular weight (in thousands) | | | |
| Kraton | Type | S/XX ratio | PS | XX | PS | Total |
| D-1101 | S-B-S | 30/70 | 14.0 | 64 | 14 | 92 |
| D-1102 | S-B-S | 28/72 | 9.5 | 47 | 9.5 | 66 |
| G-1650 | S-EB-S | 28/72 | 10.0 | 54 | 10 | 74 |
| G-1651 | S-EB-S | 33/67 | 29.0 | 116 | 29 | 174 |
| G-1652 | S-EB-S | 29/71 | 7.5 | 37 | 7.5 | 52 |
| GX-1701 | S-EP | 36/64 | 39 | 70 | — | 109 |
| GX-1702 | S-EP | 26/74 | 43 | 121 | — | 164 |

The term "radial teleblock copolymer" defines a well-known class of materials. These are commercially available or can be made by following procedures described in the patent literature, such as U.S. Pat. Nos. 3,595,942 and 4,090,996.

By way of illustration, a conjugated diene such as butadiene and a vinyl aromatic compound such as styrene are co-polymerized in the presence of an organometallic compound such as n-butyl lithium to produce a copolymeric product comprising chains terminating in an active metal atom, e.g., lithium. These copolymers are reacted with a coupling agent having more than one active site capable of reacting with and replacing the terminal metal atom on the polymer chains. The resulting copolymer is characterized by a structure comprised of a centrally located coupling agent from which extend in various directions several chains of the copolymer. If hydrogenation is desired, the copolymer can then be hydrogenated in a known manner, for example, by procedures described in De Vault, U.S. Pat. No. 3,696,088.

The one or more other thermoplastic resins component (b) may be any resin which is substantially miscible with component (a). Especially preferred are other alkenyl aromatic resin and/or polyphenylene ether resins.

The term "alkenyl aromatic resin" as it is employed in this disclosure is intended to encompass homopolymers, as well as copolymers and terpolymers of alkenyl aromatic compounds. Preferably, the alkenyl aromatic polymer is based at least in part on units of the formula

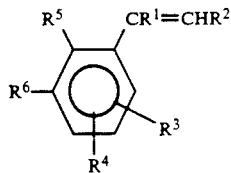

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen, and lower alkyl of from 1 to 6 carbon atoms; $R^5$ and $R^6$ are selected from the group consisting of hydrogen and lower alkyl and alkenyl groups of from 1 to 6 carbon atoms; or $R^5$ and $R^6$ may be concatenated together with hydrocarbyl groups to form a naphthyl group.

The above will encompass styrene, as well as homologs and analogs of stryene. Specific examples include, in addition to styrene, styrene maleic anhydride copolymer, chlorostyrene, bromostyrene, alphamethyl styrene, para-methyl styrene, vinyl styrene, divinylbenzene and vinyl naphthalene. Styrene is especially preferred.

The polyphenylene ethers favored for use in the practice of the invention generally contain structural units of the following formula

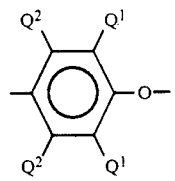

(1)

in which each of these units independently each $Q^1$ is hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylphenyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

The preferred polyphenylene ethers comprise units of the formula

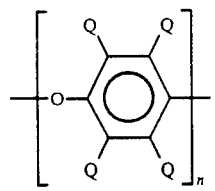

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the atom and the phenyl nucleus, hydrocarbonoxy radicals, and halohydrocarbonoxy radicals having at least two carbon atoms between the halogen atom and the phenyl nucleus.

Both homopolymers and copolymers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature. Also contemplated are graft copolymers, including those prepared by grafting onto the polyphenylene ether chain such vinyl monomers as acrylonitrile and vinyl aromatic compounds, for example, styrene, and such polymers as polystyrene and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.38 to 0.5 deciliters per gram (dl./g.), as measured in solution in chloroform at 25° C.

The polyphenylene ethers may be prepared by known methods, and typically by the oxidative coupling of at least one corresponding monohydroxyaromatic (e.g., phenolic) compound. A particularly useful and readily available monohydroxyaromatic compound is 2,6-xylenol (in which for the above formula each $Q^1$ is methyl and each $Q^2$ is hydrogen), the corresponding polymer of which may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one cobalt compound, usually in combination with various other materials. Among the preferred catalyst systems are those containing copper. Such catalysts are disclosed, for example, in the aforementioned U.S. Pat. Nos. 3,306,874 and 3,306,875, and elsewhere. They are usually combinations of cuprous or cupric ions, halide ions (i.e., chloride, bromide or iodide), and at least one amine.

Also preferred are catalyst systems containing manganese. They are generally alkaline systems containing divalent manganese and such anions as halide, alkoxide and phenoxide. Most often, the manganese is present as a complex with one or more complexing and/or chelating agents such as dialkylamines, alkanolamines, alkylenediamines, o-hydroxyaromatic aldehydes, o-hydroxyazo compounds, alphahydroxyoximes (both monomeric and polymeric), o-hydroxyaryl oximes, and beta-diketones.

Those skilled in the art will be familiar with patents disclosing manganese- and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^1$ is independently hydrogen or alkyl, providing that the total number of carbon atoms in both $R^1$ radicals is 6 or less, and each $R^2$ is independently hydrogen or a $C_{1-6}$ primary alkyl radical. Preferably, each $R^1$ is hydrogen and each $R^2$ is alkyl, especially methyl or n-butyl.

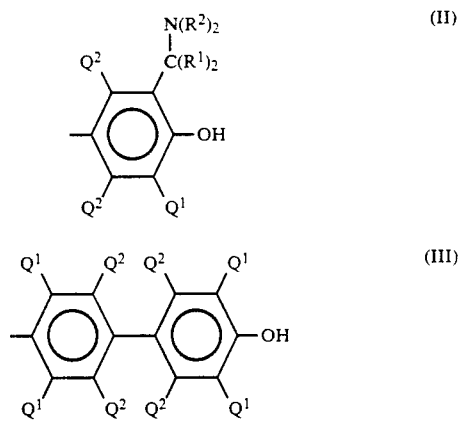

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the alpha-hydrogens on one or more $Q^1$ radicals adjacent to the hydroxy group on the terminal unit of the polymer chain. During further processing and/or blending, the aminoalkyl-substituted end groups may undergo various reactions, probably involving a quinone methide-type intermediate of formula IV, below ($R^1$ is defined as above), with beneficial effects often including an increase in compatibilization with other blend components.

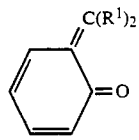

Polymers with bisphenol end groups of formula III are typically obtained from reaction mixtures in which a by-product diphenoquinone of formula V, below, is present, especially in a copper-halide-secondary or tertiary amine system. In this regard, the disclosures of the U.S. Pat. Nos. 4,234,706, 4,477,649 and 4,482,697 are particularly pertinent. In mixtures of this type, the diphenoquinone is ultimately incorporated into the polymer in substantial amounts, chiefly as an end group.

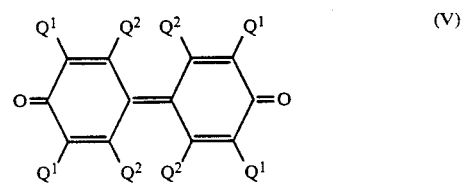

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense is not dependent on the molecular structures of the polyphenylene ether end groups.

It will thus be apparent to those skilled in the art that a wide range of polymeric materials encompassing the full recognized class of polyphenylene ether resins are contemplated as suitable for use in practice of the present invention.

Other ingredients can also be included in the compositions. These can be selected from among additives commonly employed with plastics, such as fillers and/or reinforcements, strengthening fibers, plasticizers, colorants, dyes, flame retardants, antioxidants, pigments, mold release agents, drip retardants and so forth for their conventionally employed purposes in conventional amounts. Minor but effective amounts are selected normally ranging from 1 to 60 parts by weight of the total composition weight.

The blowing agents, component (c), suitable for use in the present invention may include conventional hydrocarbon or fluorocarbon blowing agents Examples of blowing agents include aliphatic hydrocarbons such as propane, n-butane, i-butane, n-pentane, isopentane and n-hexane; cycloaliphatic hydrocarbons such as cyclopentane and cyclohexane; and halogenated hydrocarbons such as methyl chloride, ethyl chloride, dichlorodifluoromethane, chlorodifluoromethane and trichlorofluoromethane. The preferred hydrocarbon agents will include aliphatic hydrocarbon, especially those having 4 to 7 carbon-atoms. Examples include pentane, isopentane, pentene, hexane, heptane and the like.

Fluorocarbon blowing agents include:
$CCl_3F$
$CCl_2F_2$
$CHClF_2$
$CClF_2-CClF_2$.

These are commercially available as FREON® 11, FREON® 12, FREON® 22 and FREON® 114, respectively. Other halogenated hydrocarbon blowing agents may include methylene chloride, chloroform, $CCl_4$, and the like.

The blowing agents can be used in combination and usually are used in an amount generally in the range of from 4 to 40% by weight, and preferably in the range of about 5 to 15% by weight based on the weight of the thermoplastic resin beads.

The blowing agent impregnated in the expandable thermoplastic resin compositions, particles or beads obtained by the process of this invention does not easily escape from the composition, and the resin can be stored in a stable condition over long periods of time. As a result, it is not necessary, for example, as is the case with polyethylene-styrene beads, to store them in a container under pressure. Therefore, resulting expandable thermoplastic beads can be stored or transported as prepared For example, when the expandable resin particles, in accordance with this invention, are prefoamed with steam after 1 week storage at atmospheric pressure, foamed beads having sufficient expansion ratio can be obtained.

A foamed article having a high expansion factor can be prepared by heating the expandable thermoplastic resin in accordance with disclosure of this invention, by a heating medium, such as steam.

The expandable thermoplastic resins obtained by the process of this invention can be formed into a foamed shaped article of a desired configuration by pre-foaming the beads and fusing them in a mold cavity.

Furthermore, according to the process of this invention, it is possible to add a fire retarding agent, a coloring agent, an antistatic agent, etc.

DESCRIPTION OF THE PREFERRED EMBODIMENTS

The following Examples illustrate the present invention.

EXAMPLE 1

Crystal polystyrene (Hostryn 50), 250 parts by weight, was melt compounded on a Werner-Pfleiderer 30 mm twin-screw extruder with 500 parts by weight of KRATON® D 1101, a non-hydrogenated triblock copolymer of the styrene-butadiene-styrene type. The extrudate was cooled and chopped into pellets of approximately ⅛" diameter.

Into a 22 cc. par bomb was charged 2.5 gm. of the extruded pellets along with 2.84 gm. of FREON 12. FREON 12 is a gas at room temperature so the bomb was first pre-cooled in liquid nitrogen to reduce the tendency of the gas to escape. The bomb was then capped with a cover having a needle valve. The the bomb was placed in an oven at 100° C. for 20 hours. After, the bomb was removed and the needle cracked all the way to relieve the pressure. The bomb was cooled in water and the pellets removed. The pellets were expanded from their original size of about ⅛" diameter to about ⅜" diameter and exhibited small bubbles at the surface. The pellets were also quite resilient and had a density of 7.3 lbs./ft.$^3$.

EXAMPLE 2

The procedure of Example 1 is followed, substituting 250 parts by weight of a rubber-modified, high impact polystyrene for the crystal polystyrene of Example 1, and similar results are obtained Reduced density pellets expanded from their original size are obtained.

EXAMPLE 3

The procedure of Example 1 is followed, but the composition is further comprised of 200 parts by weight of a polyphenylene ether resin, and similar results are obtained. The pellets are expanded from their original size and exhibit reduced density.

EXAMPLE 4

The procedure of Example 2 is followed, but the composition is further comprised of 250 parts by weight of a polyphenylene ether resin, and similar results are obtained. The pellets are expanded from their original size and exhibit reduced density.

EXAMPLE 5

The procedure of Example 1 is followed, substituting 500 parts by weight of Kraton GX 1701 for the Kraton D 1101 of Example 1, and similar results are obtained. The pellets are expanded from their original size and exhibit reduced density.

EXAMPLE 6

The procedure of Example 3 is repeated, substituting 500 parts by weight of Kraton GX 1701 for the Kraton D 1101, and similar results are obtained. The pellets are expanded from their original size and exhibit reduced density.

EXAMPLE 7

The procedure of Example 1 is followed, substituting 500 parts by weight of Kraton G 1651 for the Kraton D 1101, and similar results are obtained. The pellets are expanded from their original size and exhibit reduced density.

EXAMPLE 8

The procedure of Example 3 is followed, substituting 500 parts by weight of Kraton G 1651 for the Kraton D 1101, and similar results are obtained. The pellets are expanded from their original size and exhibit reduced density.

While the invention has been described in detail and with reference to specific embodiments thereof, it will be apparent to one skilled in the art that various changes and modifications can be made therein without departing from the spirit and scope thereof. For example, instead of an S-B-S copolymer, copolymers of the styrene-isoprene-styrene and/or styrene-ethylene/butylene-styrene type can be utilized. Instead of poly(2,6-dimethyl-1,4-phenylene ether) there can be used poly(2,6-dimethyl-co-2,3,6-trimethyl-1,4-phenylene ether). A polyphenylene ether resin capped with an ester or an ether group can be used, see, e.g., Holoch et al., U.S. Pat. No. 3,375,228, and Hay and White, U.S. Pat. No. 4,048,143. Instead of styrene monomer, there can be used alpha-methyl styrene, bromostyrene, chlorostyrene, vinyl-toluene, mixtures of any of the foregoing and the like.

Instead of FREON 12, the blowing agent can comprise pentane, n-butane, methyl chloride, dichlorodifluoromethane, chlorodifluoromethane, trichlorofluoromethane, mixtures thereof, and the like. All such obvious variations are within the full intended scope of the appended claims.

The above-mentioned patents and publications are incorporated herein by reference.

What is claimed is:

1. An elastomeric, low density foamable composition in the form of particles or beads, comprised of:
   (a) a major amount, based on the total amount of (a) and (b), of a block copolymer comprised of an alkenyl aromatic compound and a diene monomer;
   (b) a minor amount, based on the total amount of (a) and (b), of one or more other thermoplastic resins selected from alkenyl aromatic resins, polyphenylene ether resins, and mixtures thereof; and
   (c) an easily volatile blowing agent present in an amount sufficient to foam the resin combination to a density of less than about 20 lbs./ft.$^3$.

2. A composition according to claim 1 wherein component (a) is present in an amount of greater than 50% by weight of the total amount of (a) and (b) combined.

3. A composition according to claim 1 wherein the block copolymer of component (a) is selected from the group consisting of diblock, triblock, radial teleblock copolymers and mixtures of more than one of the foregoing.

4. A composition according to claim 3 wherein component (a) is comprised of a diblock copolymer of an alkenyl aromatic compound and a conjugated diene monomer.

5. A composition according to claim 4 wherein the alkenyl aromatic compound is derived from alkenyl aromatic compounds having the formula

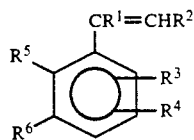

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms; or $R^5$ and $R^6$ may be concatenated together with a hydrocarbyl group to form a napthyl group.

6. A composition according to claim 3 wherein component (a) is a styrene-ethylene/propylene diblock copolymer.

7. A composition according to claim 6 wherein the molecular weight of the styrene-ethylene/propylene diblock copolymer is from about 50,000 to about 200,000.

8. A composition according to claim 7 wherein the ethylene/propylene block is of a higher molecular weight than the styrene block.

9. A composition according to claim 1 wherein component (a) is a triblock copolymer of the A-B-A type wherein (A) is comprised of alkenyl aromatic compound and (B) is comprised of a conjugated diene monomer.

10. A composition according to claim 9 wherein the alkenyl aromatic compound is derived from alkenyl aromatic compounds having the formula

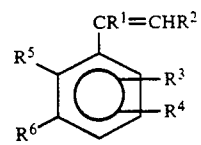

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms; or $R^5$ and $R^6$ may be concatenated together with a hydrocarbyl group to form a napthyl group.

11. A composition according to claim 9 wherein the molecular weight of each terminal block A is from about 2,000 to about 100,000 and the molecular weight of center block B is from about 25,000 to about 1 million.

12. A composition according to claim 9 wherein the center block B is hydrogenated.

13. A composition according to claim 12 wherein the molecular weight of each terminal block A is from about 4,000 to about 115,000 and the molecular weight of center block B is from about 20,000 to about 450,000.

14. A composition according to claim 1 wherein the block copolymer is an A-B-A triblock copolymer wherein each terminal block A is comprised of styrene and center block B is comprised of a diene monomer, a hydrogenated diene monomer, or mixtures of any such monomers.

15. A composition according to claim 14 wherein the molecular weight of each terminal block A is from about 7,500 to about 29,000 and the molecular weight of center block B is from about 37,000 to about 116,000.

16. A composition according to claim 14 wherein the alkenyl aromatic resin is selected from the group consisting of homopolymers, copolymers, and terpolymers based at least in part on units of the formula

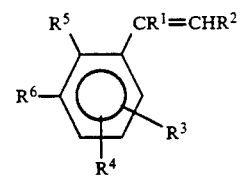

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen, and lower alkyl groups of from 1 to 6 carbon atoms; $R^5$ and $R^6$ are selected from the group consisting of hydrogen and lower alkyl and alkenyl groups of from 1 to 6 carbon atoms; or $R^5$ and $R^6$ may be concatenated together with hydrocarbyl groups to form a naphthyl group.

17. A composition according to claim 16 wherein the alkenyl aromatic resin is styrene.

18. A composition according to claim 1 wherein the polyphenylene ether resin of component (b) contains structural units of the following formula

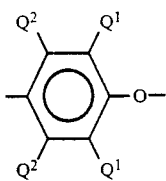

wherein for each of these units independently each $Q^1$ is hydrogen, halogen, primary or secondary lower alkyl, phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

19. A composition according to claim 18 wherein the polyphenylene ether resin is comprised of poly(2,6-dimethyl-1,4-phenylene ether).

20. A composition according to claim 18 wherein the polyphenylene ether is comprised of a copolymer of poly(2,6-dimethyl-1,4-phenylene ether) and poly(2,3,6-trimethyl-1,4-phenylene ether).

21. A composition according to claim 1 wherein the blowing agent, component (c), is selected from the group consisting of propane, n-pentane, i-butane, n-pentane, isopentane, n-hexane, cyclopentane, cyclohexane, methyl chloride, ethyl chloride, dichlorodifluoromethane, chlorodifluoromethane, trifluorofluoromethane, pentene, heptane, chloroform, carbon tetrachloride, dichlorotetrafluoroethane, and mixtures of more than one of the foregoing.

22. A composition according to claim 21 wherein the blowing agent, component (c), is present in an amount sufficient to foam the resin combination of (a) and (b) to a density of less than about 15 pounds per cubic foot.

23. A composition according to claim 22 wherein the blowing agent, component (c), is present in an amount sufficient to foam the resin combination of (a) and (b) to a density of less than about 10 pounds per cubic foot.

24. A composition according to claim 23 wherein the blowing agent, component (c), is present in an amount sufficient to foam the resin combination of (a) and (b) to a density of from about 5 to about 10 pound per cubic foot.

* * * * *